(12) United States Patent
Tomaru

(10) Patent No.: US 7,457,548 B2
(45) Date of Patent: Nov. 25, 2008

(54) QUANTUM OPTICAL TRANSMISSION DEVICE AND QUANTUM OPTICAL GENERATOR DEVICE THEREFOR

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 11/071,298

(22) Filed: Mar. 4, 2005

(65) Prior Publication Data

US 2006/0153573 A1 Jul. 13, 2006

(30) Foreign Application Priority Data

Jan. 7, 2005 (JP) .............................. 2005-002071

(51) Int. Cl.
*H04B 10/00* (2006.01)
*H04B 10/04* (2006.01)
*H04K 1/00* (2006.01)

(52) U.S. Cl. ...................... 398/161; 398/152; 398/184; 380/255

(58) Field of Classification Search ......... 398/140–142, 398/161, 152, 182–184, 198; 380/255, 278, 380/279
See application file for complete search history.

(56) References Cited

U.S. PATENT DOCUMENTS

| | | | |
|---|---|---|---|
| 5,966,224 A | 10/1999 | Hughes et al. | |
| 6,188,768 B1 | 2/2001 | Bethune et al. | |
| 7,046,366 B2 * | 5/2006 | Ozeki et al. | 356/477 |
| 7,305,091 B1 * | 12/2007 | Hirano | 380/255 |
| 2004/0100637 A1 * | 5/2004 | Teich et al. | 356/497 |
| 2004/0258421 A1 * | 12/2004 | Conti et al. | 398/183 |

(Continued)

FOREIGN PATENT DOCUMENTS

| | | |
|---|---|---|
| JP | 05-034739 | 8/1991 |
| JP | 2002-214654 | 1/2001 |

OTHER PUBLICATIONS

S.Schiller et al. "Quantum Statistics of the Squeezed Vacuum by Measurement of the Density Matrix in the No. State Representation" by physical review letters Sep. 30, 1996.*

(Continued)

*Primary Examiner*—Dalzid Singh
(74) *Attorney, Agent, or Firm*—Reed Smith LLP; Stanley P. Fisher, Esq.; Juan Carlos A. Marquez, Esq.

(57) ABSTRACT

A squeezed light generator comprises an arbitrary optical fiber, a means for temporally separating two linearly polarized components, two Faraday rotators and a high-reflection mirror. Pulse lights that are temporally separated into two orthogonally polarized components at an intensity ratio of 50:50 are reciprocatively propagated in the optical fiber, and the polarized light is rotated by 90° in an outward transmission. Since those two polarized components pass through the optical paths which are accurately equal to each other in the outward and homeward transmissions, those two polarized components interfere with each other accurately at 50:50 after reciprocation through the fiber. The interfered beam is separated by a polarizing beam splitter that is high in an extinction ratio. When the polarized lights before inputting the fiber and after reciprocating coincide with each other, it is unnecessary to maintain the polarization in the fiber propagation, and an arbitrary fiber can be used.

20 Claims, 12 Drawing Sheets

U.S. PATENT DOCUMENTS

2006/0263096 A1* 11/2006 Dinu et al. ............... 398/187
2006/0290941 A1* 12/2006 Kesler et al. .............. 356/491

OTHER PUBLICATIONS

Richart E et al. "Squeezed light for Coherent Communication" by journal of lightwave technology vol. 8, Mar. 1990.*

Kitagawa, M. et al., "Fiber Loop Interferometer for Quantum Cryptography", QELS '97 Conference, May 18, 1997, pp. 18-19, XP010238246.

European Search Report for EP 05 00 4830, dated Dec. 10, 2007.

Hirano et al., "Quantum Cryptology using Pulsed Homodyne Detection", The American Physical Society, Physical Review A, 68, (2003) pp. 042331-1 to 042331-7.

Shirasaki et al., "Squeezing of Pulses in a Nonlinear Interferometer", Journal Optical Society of America, B. vol. 7, No. 1, (Jan.1990), pp. 30-34.

Nishizawa et al., "Squeezed Vacuum Generation using Symmetric Nonlinear Polarization Interferometer", Japanese Journal Applied Physics, vol. 41 (2002), pp. L130-L132.

"Coherent Optical Communication", Corona Publication Inc., (1988), pp. 25-26 and pp. 49-50, in Japanese.

* cited by examiner (A)

(B)

(C)

QUANTUM OPTICAL TRANSMISSION DEVICE AND QUANTUM OPTICAL GENERATOR DEVICE THEREFOR

CLAIM OF PRIORITY

The present application claims priority from Japanese application JP2005-2071 filed on Jan. 7, 2005, the content of which is hereby incorporated by reference into this application.

FIELD OF THE INVENTION

The present invention relates to an optical communication and a cipher communication using a quantum mechanical manner.

BACKGROUND OF THE INVENTION

A development of the advanced information society increasingly makes secure information transmission means important. In order to ensure the security of information, a cipher technology such as a public key encryption has been currently widely employed. The public key encryption requires an astronomical calculation for decryption, which supports the security of information. However, when a computer is further developed in the future, the decryption that cannot be currently performed may be enabled.

One of methods for coping with the above problem is to use a communication manner based on a quantum-mechanical principle. There have been various optical communication methods using the quantum mechanical manner, which can be classified into two viewpoints of a state of a light and a detecting method. For fundamental quantum-mechanical optical states, there are two known states. One is a state in which the intensity becomes as small as photons can be counted one by one, and another is a squeezed state in which the uncertainty principle of the quantum mechanism is operated. The squeezed state is a state in which the uncertainty principle is operated regardless of the light intensity, which makes the light intensity treatable and contributes to applications. A squeezed state generating device is usually required to be generally large in the size and high in the stability. The squeezed state generation has been disclosed in JP 5-34739, JP2002-214654, Document "M. Shirasaki and H. A. Haus, J. Opt. Soc. Am. B7, 30-34 (1990)", and Document "N. Nishizawa, K. Sone, J. Higuchi, M. Mori, K. Yamane, and T. Goto, Jpn. J. Appl. Phys. 41, L130-L132 (2002)".

From the viewpoint of the detecting method, the quantum optical communication is classified into two methods; one system requires a reference light and another system requires no reference light. In a system that requires the reference light, it is necessary that the signal light and the reference light are equal in the wavelength to each other, and the phases are synchronous with each other. The methods of obtaining the above reference light have been variously proposed and developed at a stage of developing a coherent optical communication system (Document "Sadakuni Shimada, Coherent optical communication, pp 49-50, published by Corona Corp. in 1988").

The basic structures for that system are that a local light-source for the reference light is located at a detecting section, and the frequencies and the phases of a signal light and a local light-source are adjusted within a given range by using a sophisticated electric circuit, which is a very difficult method. In order to minimize the difficulty, there is a method using a part of the signal light when generating the reference light (Document "Sadakuni Shimada, Coherent optical communication, pp 25-26, published by Corona Corp. in 1988"). However, when a part of the signal light is used for generation of the reference light, because the signal is quantum-mechanically destroyed depending on the used amount of signal light, the method using a part of signal light for generation of the reference light cannot be basically applied to the quantum information.

In general, a part of an output light of a light source that is used to generate the signal light is used, as the reference light, in the experiment of the quantum communication which is conducted in a laboratory. With this structure, the signal light and the reference light are perfectly synchronous with each other, and the conditions of the reference light are satisfied. However, in the case where a method of transmitting the signal light and the reference light in different optical paths is used in a long-haul transmission out of the laboratory, the synchronization of the phases are not guaranteed because of the fluctuation of the phases which are attributable to a difference in the external environments of the respective optical paths. This problem is one of reasons that the quantum communication system that requires the reference light cannot be developed to a field experiment that is conducted out of a laboratory and further a practical application stage.

In order to solve the above problem, there has been proposed a method in which the signal light and the reference light are generated with the same light source as a seed light, and those lights are transmitted in the same transmission path with a time lag (Document "T. Hirano, H. Yamanaka, M. Ashikaga, T. Konishi, and R. Namiki: Quantum cryptography using pulsed homodyne detection, Physical Review A 68,042331 (2003)). As a result, the external environmental factors in the transmission are equal to each other, and the synchronization of the signal light and the reference light in the phase after the long-haul transmission is improved.

However, even in this method, the synchronization of the signal light and the reference light are not perfect. The nonlinearity of the optical fiber is generally small but becomes large as the net for the long-haul transmission due to the integral effect. The signal light and the reference light are different in the intensity, and moreover, the phase characteristic after transmission is different between the respective reference lights due to the intensity fluctuations through the nonlinearity effect.

In addition, there generally arises such a problem on the loss in the quantum communication in addition to a problem on the phase synchronization. When the above quantum signal is partially extracted, the quantum state is destroyed as much as the extracted amount. This supports that the quantum communication is secure. Even if the quantum signal is not intentionally partially extracted, the signal is partially destroyed by the transmission loss. Accordingly, in order to transmit the quantum signal at a long distance, a breakthrough technique is required.

SUMMARY OF THE INVENTION

It is essential to provide a simple quantum light source in order to optically conduct information processing or information transmission by using the quantum mechanical manner. A quadrature squeezed state that is a typical quantum light of wide application is generated by using a parametric down conversion. However, this method requires a large-scaled device and the high stability and therefore is not a simple quantum light source.

As a relatively simple method, there has been proposed a method using the Kerr effect of an optical fiber (M. Shirasaki and H. A. Haus, J. Opt. Soc. Am. B7, 30-34 (1990)). In the method, a so-called Sagnac loop is structured by a beam splitter (or a fiber coupler) of 50:50 and a polarization maintaining optical fiber, and a pump beam is divided into two beams, the beams are propagated in the fiber in opposite directions, and the beams are resynthesized. As a result, the quadrature squeezed state is generated from a port that did not input the pump beam. However, there arises such problems that the beam splitter of accurate 50:50 is difficult, that the disturbance of the wave plane is influenced when two beams interferes with each other, and that a part of the original pump beam is outputted from the port from which the quadrature squeezed state is generated at the same time by the above influences.

In order to solve the above problem, there has been proposed a method in which two polarization maintaining fibers that are equal in the length to each other are spliced together so that the optical axes of those fibers are orthogonal to each other, and the exited beam is propagated in one way (N. Nishizawa, K. Sone, J. Higuchi, M. Mori, K. Yamane, and T. Goto, Jpn. J. Appl. Phys. 41, L130-L132 (2002)). In the method, one beam is inputted to polarization maintaining fiber without being divided into two beams, split into two components corresponding to the two optical axes of the polarization maintaining fiber, and then propagated. Two beams are propagated in the completely same wave guide, and those two components are resynthesized. Therefore, even if a disturbance occurs on the wave plane, the disturbances between those components are equal to each other, and two beams are resynthesized. However, in this method, the lengths of those two polarization maintaining fibers must accurately coincide with each other, and also must be spliced together in a state where each optical axis of those two fibers are orthogonal to each other, which invites the technical difficulty.

Although being out of sequence, as a method that can cope with the above problem, there has been proposed a method in which an optical beam is reciprocated and transmitted by using not two but only one polarization maintaining fiber (QELS '93 technical Digest, Friday Morning 281, QFF3). A $\lambda/4$ waveplate is disposed between the fiber and a mirror, two polarization directions are exchanged between the outward transmission and the homeward transmission, and the two polarization experience the two optical axes of the polarization maintaining fiber in the outward and homeward transmissions one by one. It is unnecessary to make the lengths of two polarization maintaining fibers accurately coincide with each other or to splice those two fibers together. The action that is equivalent to a case in which a beams is propagated through the two polarization maintaining fibers can be achieved by only one optical fiber.

All of the above-mentioned methods use the polarization maintaining optical fiber. However, because the polarization maintaining optical fiber is special with the limited applications, it is not always possible to prepare the required specification. If an ordinary single mode optical fiber that prepares various specifications in which polarization is not maintained can be use, there is a possibility that the quantum communication is put in practical use even in a wavelength band that makes it impossible at present to efficiently generate the squeezed state. Therefore, the present invention provides a transmission device using the squeezed state, and a method using a polarization non-maintaining optical fiber for generating the squeezed state.

In the signal transmission between a transmitter and a receiver, not only the signal light and the reference light are transmitted through the same fiber but also those lights are temporally superimposed on each other by the orthogonal polarizations for transmission. The used signal light is a squeezed light.

The squeezed light is generated as follows: First, the exited beam, which is a pulsed linearly polarized light, passes through a first Faraday rotator with 45° rotation. The linearly polarized light that has rotated by 45° is split into two linearly polarized lights that are orthogonal to each other by 50:50. After a delay is given respective polarized lights so that pulses of the respective polarized lights are not temporally superimposed on each other, those polarized lights are inputted an arbitrary single mode optical fiber that does not require to maintain the polarizations and then propagated. A second Faraday rotator with 45° rotation and a reflection mirror are disposed at an exit of the optical fiber. Since the polarized light reciprocatively passes through the second Faraday rotator twice in total, the polarized light rotates by 90° in total. The polarizations of those two polarized lights that are propagated in the optical fiber are exchanged with each other for the outward transmission and the homeward transmission. That is, the reciprocating transmission is conducted by only one optical fiber that does not maintain the polarization. The pump light that moves backward again passes through a delay unit and the first Faraday rotator that rotates the polarization by 45°, and returns to an initial position. Since the polarized light passes through the first and second Faraday rotators twice, respectively, the rotation angle of the polarized light becomes 180° in total, and the polarization state of the pump beam returns to the initial linear polarization state. Since the squeezed light appears as the polarization state that is orthogonal to that pump light, the squeezed light can be extracted by using a polarizing beam splitter.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
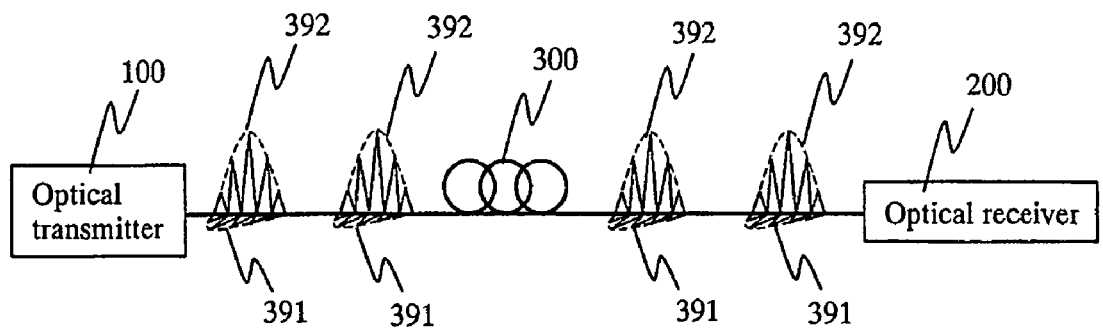
FIG. 1 is a diagram showing a system structure according to one of basic configurations of the present invention.

FIG. 1 is a diagram showing a system structure according to one of basic configurations of the present invention. A signal light 391 and a reference light 392 which have been outputted from an optical transmitter 100 to an optical fiber 300 are temporally superimposed on each other with the orthogonal polarization, and then transmitted to an optical receiver 200. The signal light 391 and the reference light 392 are generated with an identical light source as a seed light, and transmitted while being temporally superimposed on each other by the orthogonal polarization. Therefore, those phases are synchronous with each other when those signals are detected by the optical receiver 200.

When a pulsed light is propagated in an optical fiber at a long distance, the pulse is generally spread because of the fiber dispersion. However, when the pulsed light is propagated as a soliton, the pulsed light can be exceptionally propagated while maintaining the pulse width. In the quantum communication, it is general that the signal light 391 is a weak light, and the reference light 392 is relatively strong in the intensity. When the reference light 392 and the signal light 391 are propagated in such a manner that the reference light 392 is brought into a soliton state, and the signal light 391 that is the orthogonal polarization is trapped, it is possible to propagate the weak signal light while maintaining the pulsed width. Also, as described below, the nonlinear effect of the optical fiber naturally has a function of generating the quantum state so as to be employed in generation of the squeezed light. In the fiber transmission, the property of the quantum state is generally destroyed due to the transmission loss. However, the signal light 392 that has been trapped by the reference light 391 of a soliton has a property of generating the quantum state while destroying the quantum state. Accordingly, the signal light having the quantum mechanical property can reach the receiver although the signal light does not completely maintain the initial quantum state in the transmission time.

Figure 2:
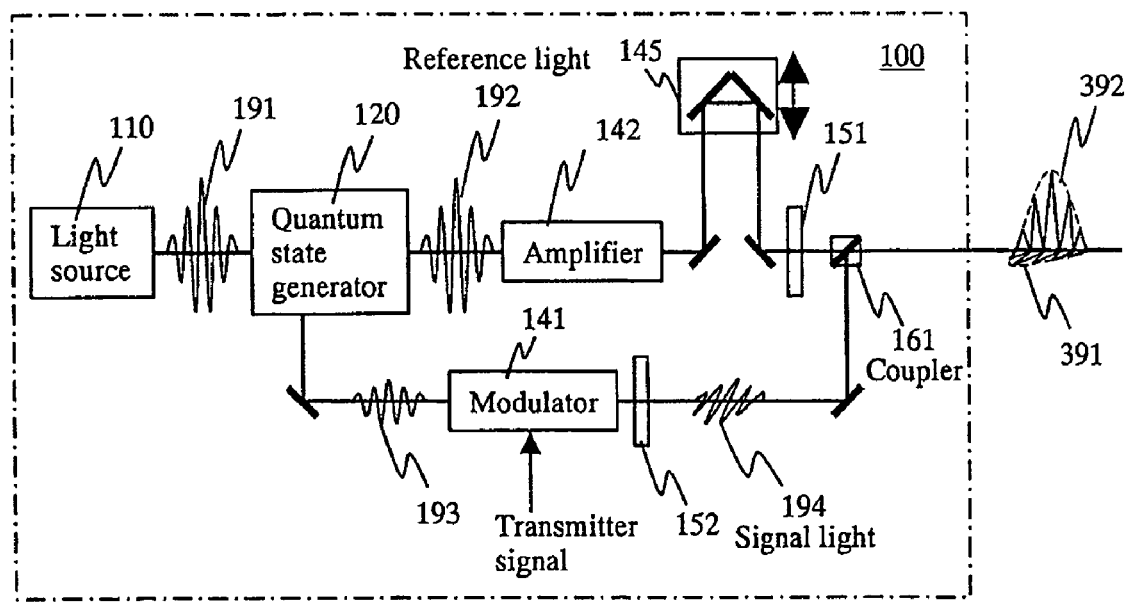
FIG. 2 is a block diagram showing an example of the structure of a transmitter for generating a polarized signal light and a polarized reference light that are orthogonal to each other and temporally superimposed on each other with the same light source as a seed light.

FIG. 2 is a block diagram showing an example of the structure of a transmitter for generating the signal light 391 and the reference light 392 that are temporally superimposed on each other by the orthogonal polarizations with an identical light source as the seed light. Reference numeral 110 denotes a light source, and 191 is an output light from the light source 110. A quantum state generator 120 generates a quantum light 193. In the case where the squeezed state is considered as the quantum light 193, there are proposed, as a method of generating the quantum light, a method using a parametric down conversion (R. E. Slusher, et al., "Observation of squeezed stages generated by four-wave mixing in an optical cavity," Phys. Rev. Lett. 55, 2409-2412 (1985); E. S. Polzik, J. Carry, and H. J. Kimble, Appl. Phys. B 55, 279 (1992)), a method using an optical fiber and a beam splitter (M. Shirasaki and H. A. Haus, "Squeezing of pulses in a nonlinear interferometer," J. Opt. Soc. Am. B7, 30-34 (1990)), and a method of the present invention which will be described in the following embodiments.

The quantum light 193 is generated by a part of the output light 191 of the light source 110 from the viewpoint of an energy. A component 192 that has not been transferred to the quantum state is used as the reference light. The reference light 192 is amplified by an amplifier 142 if necessary. The quantum light 193 thus generated is superimposed on a transmitter signal by a modulator 141 to provide a quantum signal light 194. In this situation, signals for checking the synchronous relation with the reference signal in the optical receiver 200 may be conveniently inserted at given intervals in the quantum signal 194. The signals for checking the synchronous relation can be achieved by setting the degree of modulation in the modulator 141 to a predetermined value.

The signal light 194 is the polarized light that are orthogonal to the reference light 192 and coupled with the reference light 192 by a coupler 161, and transmitted in an optical fiber 300. It is simple that the coupler 161 is made up of a polarizing beam splitter. The polarizing beam splitter couples the linearly polarized lights that are orthogonal to each other together, and the reference light 192 and the signal light 194 that are two input lights to the coupler 161 are adjusted to appropriate polarizations by polarization controllers 151 and 152. Usually, since the reference light 192 and the quantum light 193 are linearly polarized lights, the polarization controllers 151 and 152 can achieve its object by a half-waveplate. Reference numeral 145 denotes a optical delay unit, and its position is variable as indicated by an arrow. The optical delay unit 145 is used to adjust a timing of the reference light 192 that has been introduced into the coupler 161.

In the drawing, the reference numeral and description of mirrors having a function of merely changing the beam directions will be omitted. The same is applied to the subsequent drawings.

The optical fiber 300 can be applied to both of a system using a polarization maintaining fiber and a system using no polarization maintaining fiber. In the system using the polarization maintaining fiber, there may be an option by which a fast axis and a slow axis are exchanged with each other every given length, and of the total time required for transmission are made substantially equal to each other with respect to two polarization directions.

Figure 3:
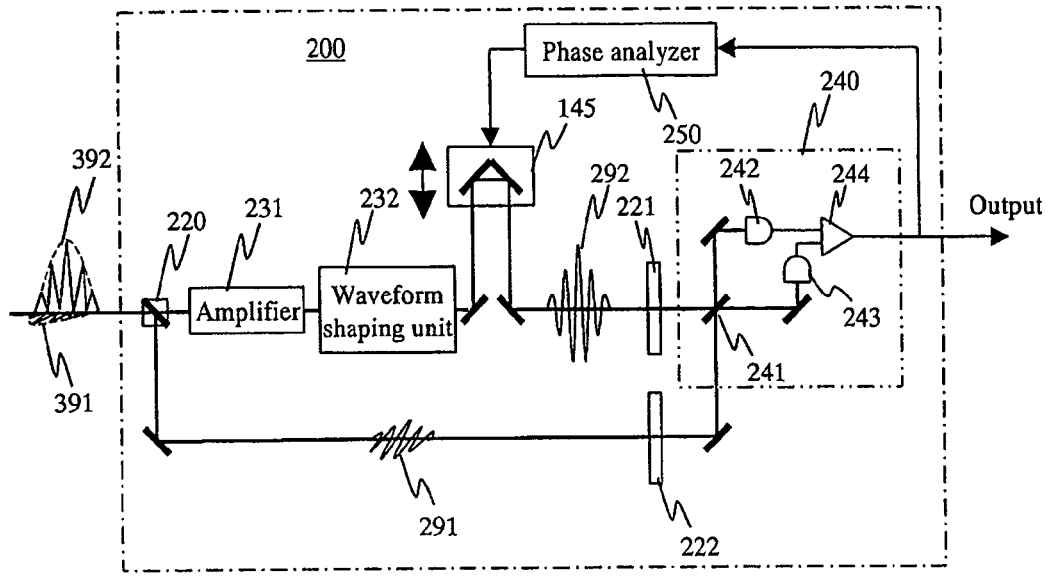
FIG. 3 is a block diagram showing an example of the structure of a receiver in the case where the polarizations of a reference light and a signal light are specified.

In the case where the polarization maintaining fiber is used as the optical fiber 300, and the polarizations of the reference light 192 and the signal light 194 are specified, the structure of the receiver 200 may be relatively simple. FIG. 3 is a block diagram showing an example of the structure of the receiver in the case where the polarizations of the reference light 192 and the signal light 194 are specified. First, the signal light 291 and the reference light 292 are split by a beam splitter 220. It is simple that the beam splitter 220 is formed of a polarizing beam splitter. The split reference light 292 is amplified and shaped in the waveform through the an amplifier 231 and a waveform shaping unit 232 as occasion demands, and its optical length is adjusted by the optical delay unit 145, and then guided to a beam splitter 241 having a split ratio of 50:50, and then interferes with the signal light 291.

In order to make the signal light 291 and the reference light 292 interfere with each other, it is necessary that the polarizations of those lights coincide with each other, and the optical path lengths also coincide with each other in the phase level. Polarization controllers 221 and 222 are disposed for the former purpose, and the purpose can be achieved by the half-waveplate in view of the fact that the signal light 291 and the reference light 292 are normally linear polarization. The optical delay unit 145 is disposed to adjust the optical path length which is the latter purpose. There are various methods with respect to the beam splitter 241, and there is a method using the polarizing beam splitter other than the ordinary beam splitter or fiber coupler.

Two lights that has passed through the beam splitter and interfered with each other are detected by photo detectors 242 and 243, respectively. The photo detectors 242 and 243 may be formed of photodiodes or a photomultiplier. Detection signals from the photo detectors 242 and 243 are processed by an electric circuit 244 to provide output signals. Parts of the output signals are guided into a phase analyzer 250, and the phase analyzer 250 analyzes a phase difference between the signal light 291 and the reference light 292, and the phase difference is fed back to the optical delay unit 145 so as to optimize the phase difference.

Figure 4:
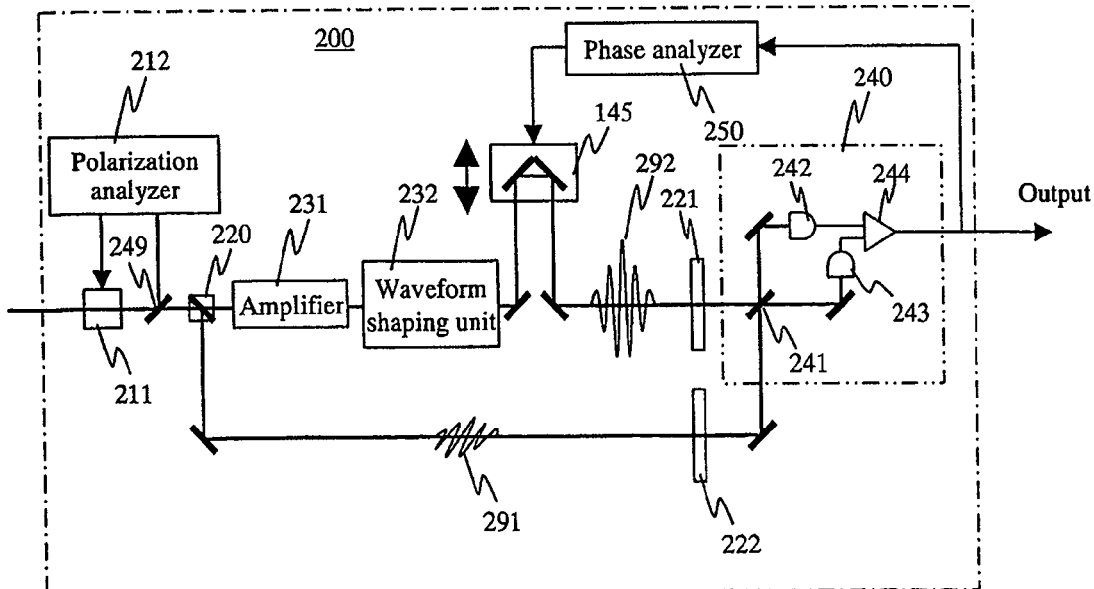
FIG. 4 is a block diagram showing an example of the structure of a receiver in the case where a polarization controller is located before an input of a beam splitter.
Figure 5:
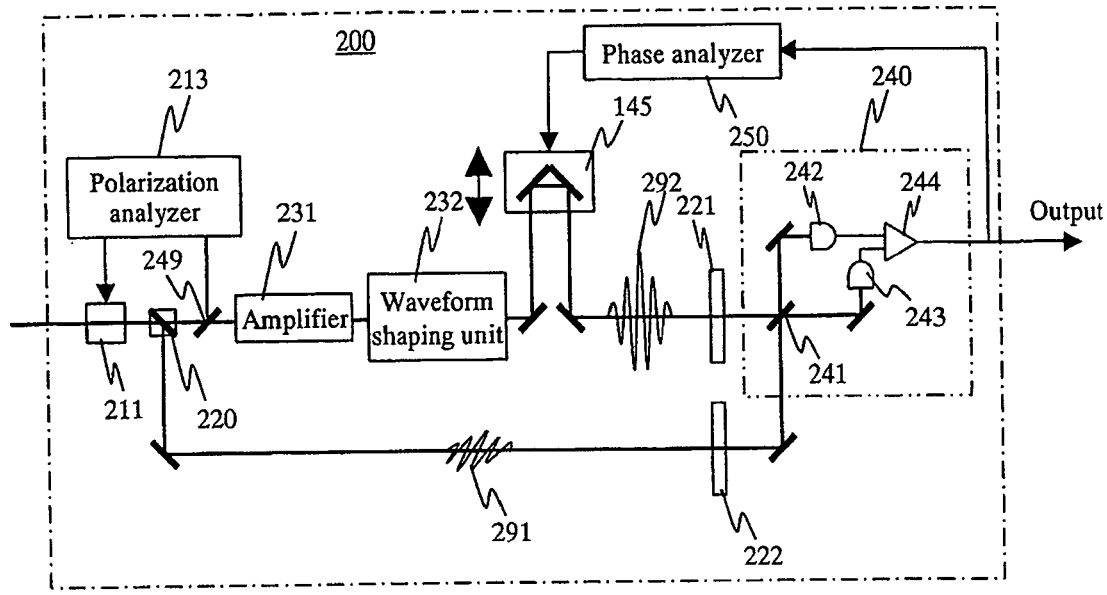
FIG. 5 is a block diagram showing another example of the structure of a receiver in the case where a polarization controller is located before the input of the beam splitter.
Figure 6:
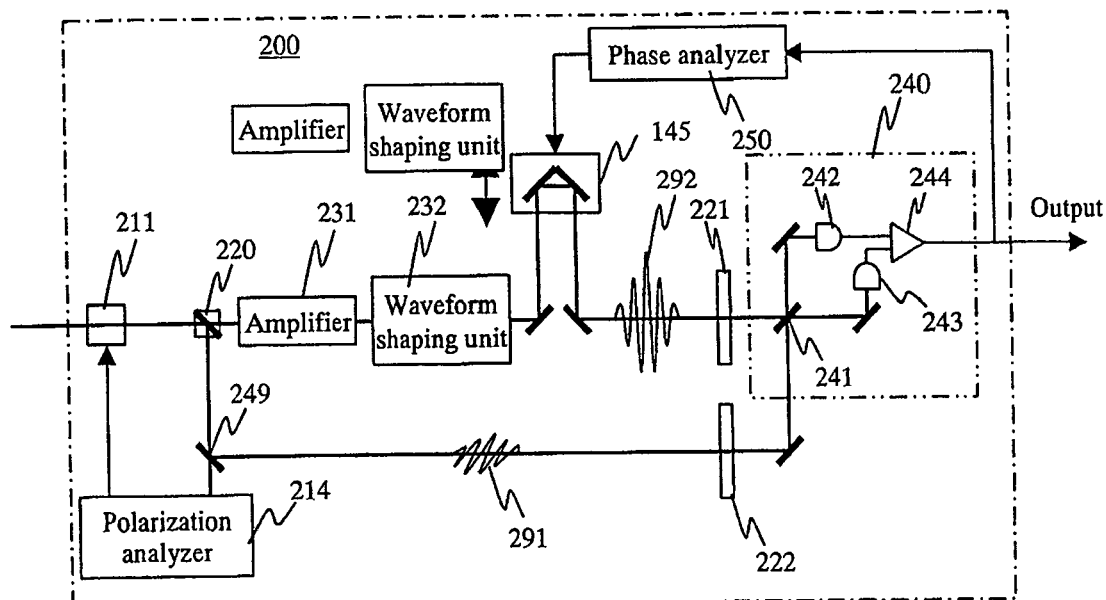
FIG. 6 is a block diagram showing still another example of the structure of a receiver in the case where the polarization controller is located before the input of the beam splitter.

Even in the case of using a ordinary optical fiber that does not maintain the polarization for the optical fiber 300, or even in the case of using the polarization maintaining fiber, when the polarization is intended to be adjusted, the receiver 200 has the polarization controller 211 located before an input of the beam splitter 220. FIGS. 4 to 6 are block diagrams showing the structure of the receiver in the case where the polarization controller 211 is located before an input of the splitter 220, respectively. In the case where the polarizing beam splitter is used for the splitter 220, the signal light is adjusted to be the linearly polarized light by the polarization controller 211. The plane of polarization of the light that has been transmitted to the receiver 200 is analyzed by the polarization analyzer 212.

The polarization analyzer 212 may be located at various positions, and there are a case in which a part of the light is split by the beam splitter 249 in front of the splitter 220 (FIG. 4), a case in which a part of the reference light is split by the beam splitter 249 at the rear of the splitter 220 (FIG. 5), and a case in which a part of the signal light is split by the beam splitter 249 at the rear of the splitter 220 (FIG. 6). In any cases, the analyzed results are fed back to the polarization controller 211. The structures of the receivers 200 shown in FIGS. 4 to 6 are identical with the structure of the receiver 200 shown in FIG. 3 except for the periphery of the polarization controller 211.

Figure 7:
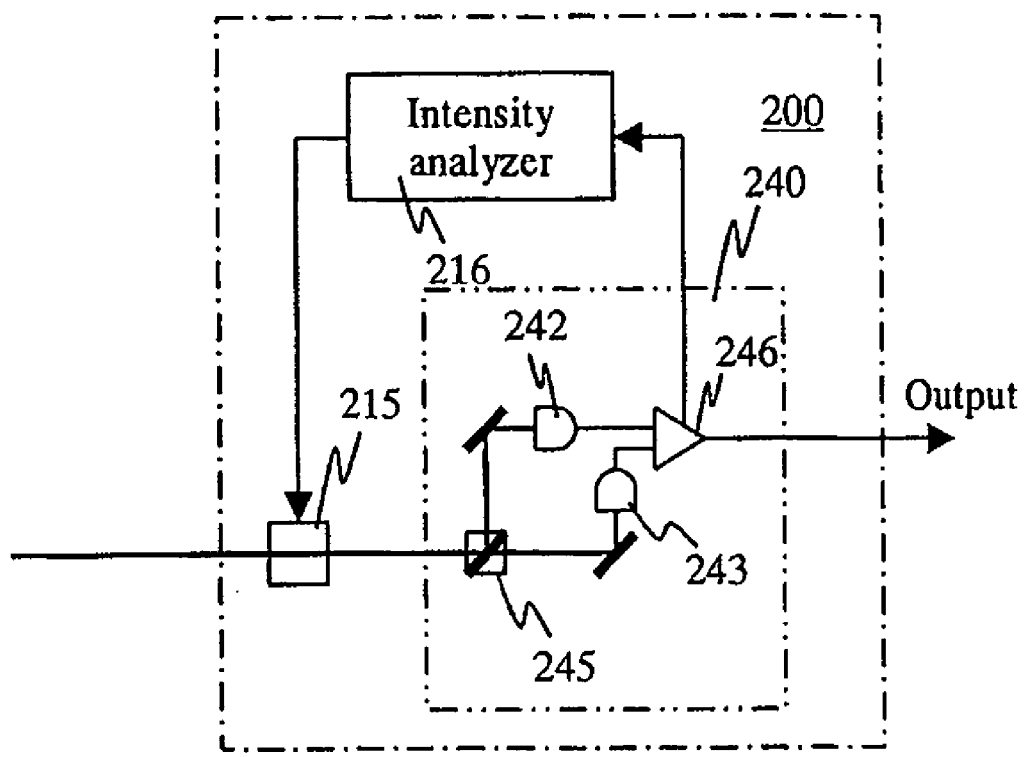
FIG. 7 is a block diagram showing a structural example of a receiver in the case where there is no need of amplifying and waveform-shaping the reference light.

In the case where it is unnecessary to amplify and waveform-shape the reference light in the receiver, the receiver 200 can be simply structured. FIG. 7 is a block diagram showing a structural example of the receiver in the case where it is unnecessary to amplify and waveform-shape the reference light. The polarization controller 215 is adjusted, and the reference light becomes the linearly polarized light with an angle of 45° with respect to the P-polarization, where P-polarized light is transmitted at the polarizing beam splitter 245, and the reference light is divided into two lights by the polarizing beam splitter 245. In this situation, the signal light is also divided into two lights at the same time, and the respective divided reference and signal beams interfere with each other. The respective beams that have interfered with each other are subjected to photoelectric conversion by the photo detectors 242 and 243, and then processed by the electric circuit 246. Because the relative detection intensities of the photo detectors 242 and 243 depend on the input polarization to the polarizing beam splitter 245, the intensities are fed back to the polarization controller 215 through the intensity analyzer 216 so that the input intensities of the photo detectors 242 and 243 become equal to each other.

Second Embodiment

Subsequently, a description will be given in more detail of an embodiment of the quantum state generator 120 according to the present invention.

Figure 8:
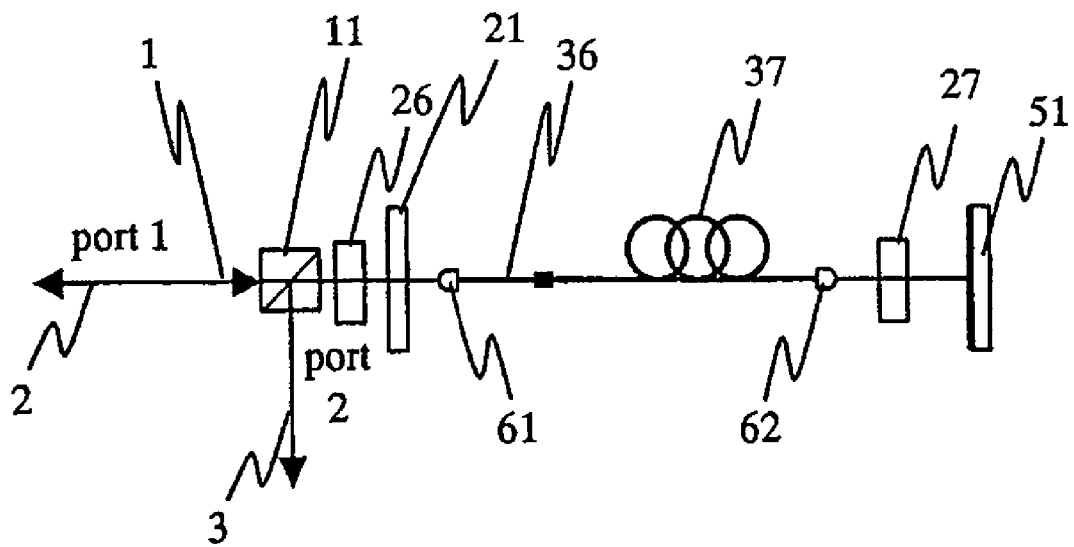
FIG. 8 is a block diagram showing a quantum state generator according to a first structural example of the present invention.

FIG. 8 is a block diagram showing a quantum state generator 120 according to a first structural example of the present invention. The pump light 1 is inputted to the polarizing beam splitter 11. The polarization of the pulsed pump light 1 is adjusted to a transparent direction of the polarizing beam splitter 11 (p-polarization) in advance. The transmitted pump light 1 passes through a Faraday rotator 26, the polarization rotates by 45°, and the polarization is adjusted by a λ/2 waveplate 21. Here the Faraday rotator 26 and the λ/2 waveplate 21 could be interchanged in place with each other. Thereafter, the pump light 1 is focused by a collimator lens 61 and then inputted to a short polarization maintaining optical fiber 36. The input light to the fiber 36 is adjusted by the λ/2 waveplate 21 so that the intensities of the components in the two optical axes of the fiber 36 become equal to each other. In the case where the optical axis direction of the fiber 36 can be adjusted at the input part, the λ/2 waveplate 21 can be omitted.

An object of locating the polarization maintaining optical fiber 36 is to make a delay between respective two pulse components coinciding with the two optical axes of the polarization maintaining fiber 36, to be regarded as independent pulses. Accordingly, the required length depends on the birefringence of the fiber 36 and the pulse width. For example, in order to temporally separate the pump light having the pulse width of about 100 fs by the polarization maintaining fiber having a beat length of 3.0 mm, there is required the polarization maintaining fiber 36 of about 10 cm. Since the role of the polarization maintaining fiber 36 is to temporally separate the two polarized components from each other, it is preferable to reduce the dispersion and the nonlinear effect as much as possible. In the case of giving priority to the low dispersion in the wavelength band of 1.55 μm, the polarization maintaining fiber of the dispersion-shifted type may be employed. The pump light 1 that has been transmitted through the fiber 36 is subsequently guided to a fiber 37 for generating the squeezed light. It is unnecessary that the fiber 37 is of the polarization maintaining type, and an arbitrary fiber can be used as occasion demands. It is desirable that the connection of the fibers 36 and 37 are spliced together in order to suppress the loss as much as possible. However, it is possible to connect the fibers by a connector taking the convenience of the fiber exchange into consideration. When the connection surface is antireflection-coated, the reflection loss can be reduced. What is indicated by a short and bold line in a portion where the fibers 36 and 37 are brought in contact with each other in FIG. 8 means the connection of those fibers.

The pump light that has been transmitted through the fiber 37 is collimated by a collimator lens 62, passes through the Faraday rotator 27 with 45° (or 45°) rotation, and reaches a mirror 51. The pump light 1 reflected from the mirror 51 is transmitted backward in the same waveguide. Since the pump light passes through the Faraday rotator 27 twice by reciprocation, the pump light rotates by 90° (or −90°) in total. Accordingly, in the optical fibers 37 and 36, the pump light is propagated in the orthogonal polarization state in the outward transmission and the homeward transmission. In the optical fiber 37 that does not maintain the polarization, the polarized light becomes generally an elliptically polarized light. Since the pump light is propagated in the completely identical waveguide, exchanging orthogonal polarization in the outward transmission and the homeward transmission, when returning to the polarization maintaining fiber 36, the pump light is linearly polarized. The polarization maintaining fiber 36 delays two polarized components in the outward transmission. However, since two polarized components are exchanged with each other in the homeward transmission, the delay is cancelled, and the pump light again returns to the one polarized light. Then, the pump light passes through the Faraday rotator 26, and the polarized light rotates by 45°. Since the pump light 1 passes through the two Faraday rotators 26 and 27 twice per reciprocation, the rotation of the polarized light becomes 180° (or 0°) in total. That is, the polarization direction of the pump light is identical with that at the time of inputting the pump light. Accordingly, the pump light 1 is transformed into a light 2 and is transmitted through the polarizing beam splitter 11, and is used as the reference light 192. As will be described below, a squeezed light 3 (quantum light 193) is outputted from a port 2 of the polarizing beam splitter 11.

The polarizing beam splitter 11 can be applied with various types including a normal polarizing beam splitter cube in which two triangular prisms are coated and then bonded together. For example, there are a planar polarizing beam splitter coated on a glass substrate, a Wollaston prism, a Rochon prism, a Glan laser prism, a Glan-Thompson prism, or the like. The polarizing beam splitter cube is inexpensive and treatable because the reflection angle is 90°. However, the polarization purity of the reflected light is generally low, and an S-polarization that is a reflected polarized component slightly contains P-polarized light. In the case where the purity of the polarized component is intended to be enhanced, after the polarized light has been separated by the polarizing beam splitter 11, the polarized light is allowed to be transmitted through another polarizing beam splitter with the result that the useless components are removed. Not limited to this embodiment, in the case where the purity of the polarized light is intended to be enhanced, this method can be applied.

Figure 9:
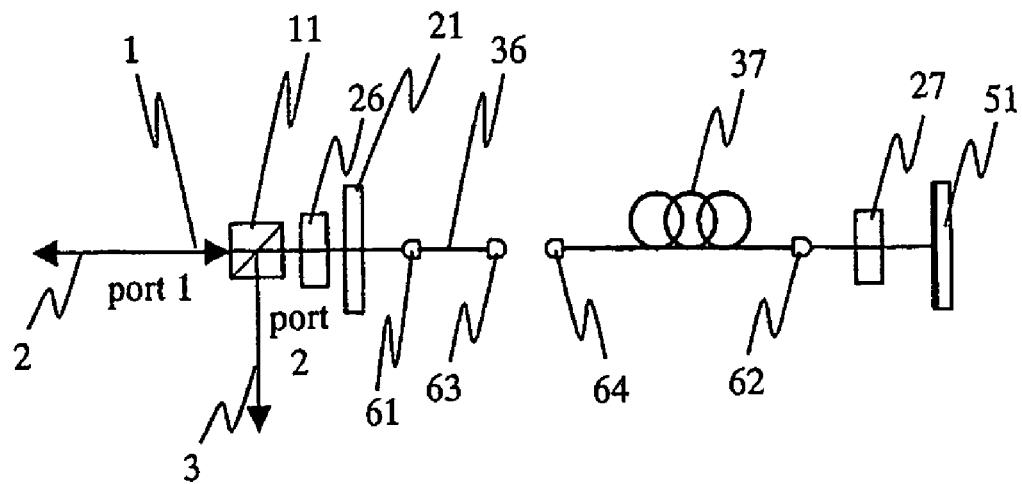
FIG. 9 is a block diagram showing a quantum state generator according to a second structural example of the present invention.

FIG. 9 is a block diagram showing a quantum state generator 120 according to a second structural example of the present invention. As is apparent as compared with FIG. 8, the second structural example is identical with the first structural example except that after an output light from the polarization maintaining optical fiber 36 has been extracted to a free space (in air) by a collimator lens 63 once, the output light is inputted to a fiber 37 by means of another collimator lens 64.

The above-described behavior of the light that is propagated through the fibers 36 and 37 is not taken the quantum effect into consideration. The quantum effect is brought from a vacuum noise that is inputted from the port 2 (S-polarization) when the pump light 1 is inputted from the port 1 of the polarizing beam splitter 11. The vacuum noise is a concept inherent to the quantum mechanics. The vacuum noise is divided into two components as in the case where the pump light 1 is divided into two polarized components by the polarization maintaining fiber 36. Since the two-divided vacuum noise is propagated in the fiber 37 together with the two-divided pump light 1, the vacuum noise also receives the Kerr effect that is caused by the pump light 1. The vacuum noise is geometrically expressed as an uncertain circle representative of the quantum fluctuation. The vacuum noise that has reciprocated in the optical fiber 37 becomes elliptic and then outputted from the port 2 of the polarizing beam splitter 11. The light having the elliptic quantum fluctuation is a quantum light that is called "quadrature squeezed state".

In order to increase the Kerr effect in the optical fiber 37, a pump light is desirable which has high peak intensity, and whose pulse waveform is not deformed during the fiber propagation. An optical soliton is known as a stably propagated state in an optical fiber under the Kerr effect. The conditions under which the stable soliton exists are theoretically known by expression (1).

$$\gamma PT^2/|\beta_2|=1 \quad (1)$$

where $\gamma$ is a coefficient representative of the Kerr effect, P is a peak intensity of the pump light, T is a pulse width, and $\beta_2$ is a group velocity dispersion. What is understood from the expression is that a higher peak intensity is required in the fiber whose group velocity dispersion is large. Since the available peak intensity is limited, it is advantageous if the group velocity dispersion can be selected according to the condition. Usually, because the polarization maintaining fiber is manufactured only for limited dispersions, there is a case in which a soliton cannot be produced at a necessary wavelength band. However, because the fibers with various dispersions exist in the general optical fibers that do not maintain the polarization, the present invention enables us to generate the soliton under various conditions, and the squeezed light can be effectively generated.

As the light source of the pump light 1, there are a solid-state laser, a fiber laser, a semiconductor laser or the like. Since the squeezed state is generated by using the Kerr effect, it is effective that the pump light is pulsed and of high-peak power in order to effectively generate the squeezed state. The solid-state laser and the fiber laser can generate a femtosecond pulse and are particularly effective to obtain the high peak power. There are Cr:YAG solid-state laser and Er-doped fiber laser with respect to the wavelength band of 1.55 µm advantageous to the optical fiber communication.

Figure 10:
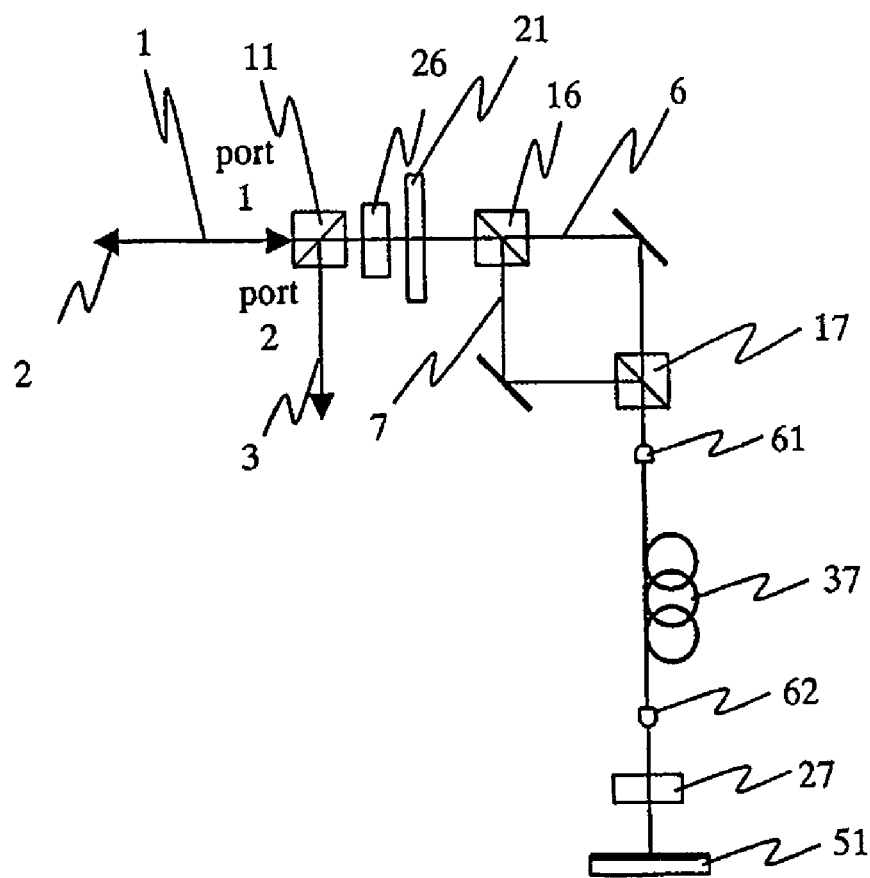
FIG. 10 is a block diagram showing a quantum state generator according to a third structural example of the present invention.

FIG. 10 is a block diagram showing the quantum state generator 120 according to a third structural example of the present invention. In the first and second structural examples, a difference in the group velocity between the two polarized components within the polarization maintaining fiber is utilized in order to provide a delay between two polarized components. As is apparent as compared with FIGS. 8 and 10, the third structural example is identical with the first structural example shown in FIG. 8 until the input pump light 1 gets to the λ/2 waveplate 21. Two polarized components that have passed through the λ/2 waveplate 21 are then inputted to a polarizing beam splitter 16 and equally divided into two polarized components and advanced to optical paths 6 and 7, respectively. The separated polarized lights are again coupled by the polarizing beam splitter 17 and then advanced to a collimator lens 61 and an optical fiber 37. A slight difference in the optical path length is provided between the optical paths 6 and 7 so that the pulsed lights of two polarized components are not temporally superimposed on each other within the optical fiber 37. The vacuum noise receives the Kerr effect within the optical fiber 37 as in the first structural example. Also, in the homeward transmission, two polarized lights are exchanged with each other in polarization, and the squeezed light 3 is finally emitted from the port 2.

Third Embodiment

Figure 11:
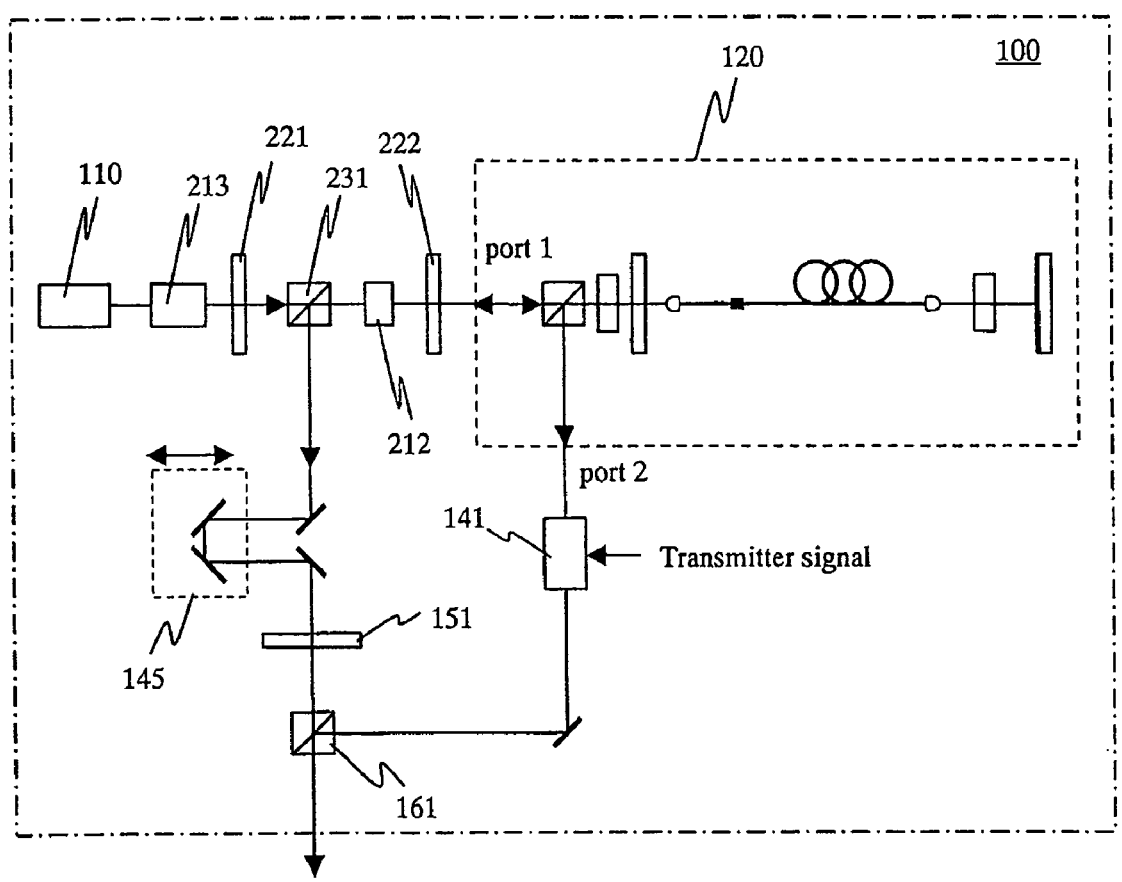
FIG. 11 is a diagram showing an example of a transmitter in the case where a squeezed light that has been generated by the quantum state generator described in a second embodiment is transformed into a signal light to conduct optical communication.

FIG. 11 is a diagram showing an example of a transmitter 100 in the case where the squeezed light that has been generated by the quantum state generator 120 described in the second embodiment is transformed into a signal light to conduct optical communication. In this example, the quantum state generator 120 described with reference to FIG. 8 is used. The pump light that has been outputted from the pump light source 110 passes through an isolator 213 and a λ/2 waveplate 221, and then is inputted to a polarizing beam splitter 231 with P-polarization. The pump light 1 that has passed through the polarizing beam splitter 231 passes through a Faraday rotator 212 that rotates the polarization by 45°, and passes through a λ/2 waveplate 222 to provide a P-polarized light. The pump light 1 is inputted to the quantum state generator 120 described with reference to FIG. 8 to obtain the pump light 2 that is outputted from the port 1, and the squeezed light 3 from the port 2.

The squeezed light 3 becomes a signal light on which a signal is superimposed by a modulator 141, and then guided to the polarizing beam splitter 161. The pump light 2 that has been outputted from the port 1 passes through the λ/2 waveplate 222 and the Faraday rotator 212, and then returns to the polarizing beam splitter 231. Since the pump light 2 passes through the Faraday rotator 212 twice by reciprocation, the polarization is rotated by 90° in total to S-polarization. The S-polarized light is reflected by the polarizing beam splitter 231, and is adjusted in the optical path length by the delay unit 145, and the polarization is adjusted to P-polarization by the λ/2 waveplate 151. Thereafter, the P-polarized light is combined with the signal light by the polarizing beam splitter 161. The polarized light that has been reflected by the polarizing beam splitter 231 is used as a reference light for detection of the signal light in the receiver.

Figure 12:
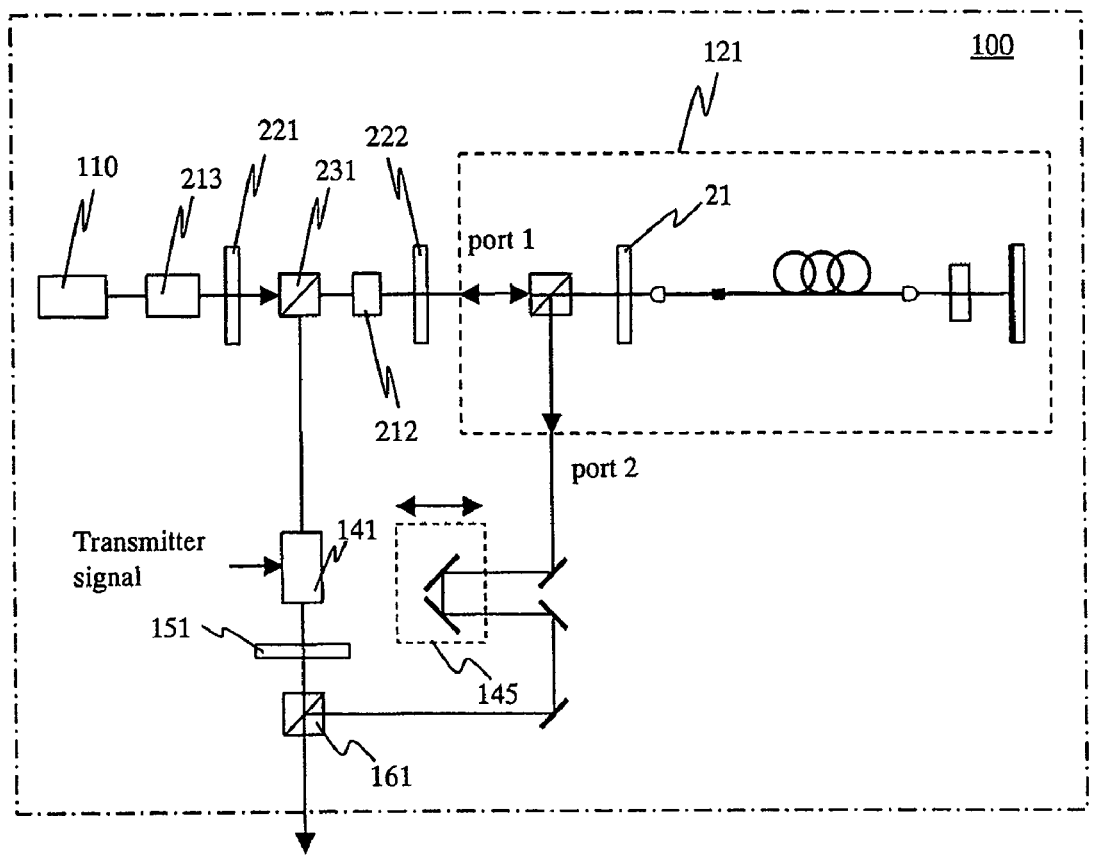
FIG. 12 is a diagram showing an example in which the structure of the transmitter shown in FIG. 11 is simplified.

FIG. 12 shows the simplified structure that reduces the number of parts in FIG. 11. The pump light that has been outputted from the pump light source 110 passes through the isolator 213 and the λ/2 waveplate 221, and is then inputted to the polarizing beam splitter 231 with P-polarization. The pump light 1 that has passed through the polarizing beam splitter 231 passes through the Faraday rotator 212 that rotates the polarization by 45°, passes through the λ/2 waveplate 222 to provide the P polarized light, and is then inputted to the quantum state generator 121. The quantum state generator 121 omits the Faraday rotator 26 from the quantum state generator 120 described with reference to FIG. 8. Because the Faraday rotator 26 is omitted, the pump light that reciprocates the quantum state generator 121 merely rotates the polarization by 90°. As a result, the pump light 2 that has been reflected is obtained in the port 2 as an output, and the squeezed light 3 is obtained in the port 1.

The pump light 2 is adjusted the optical path length by the delay unit 145, and is then reflected by the polarizing beam splitter 161. The squeezed light 3 that has been outputted from the port 1 passes through the λ/2 waveplate 222 and the Faraday rotator 212, and then returns to the polarizing beam splitter 231. Since the squeezed light 3 passes through the Faraday rotator 212 twice by reciprocation, the polarization rotates by 90° in total, and the S-polarized light is inputted to the polarizing beam splitter 231 and then reflected. After reflection, the signals are superimposed on the squeezed light in the modulator 141 to provide a signal light. After the polarization has been adjusted to P-polarization by the λ/2 waveplate 151, the signal light is coupled with the reference light by the polarizing beam splitter 161. The pump light 2 whose optical path length is adjusted by the delay unit 145 is used as a reference light for detecting the signal light in the receiver.

Fourth Embodiment

Figure 13:
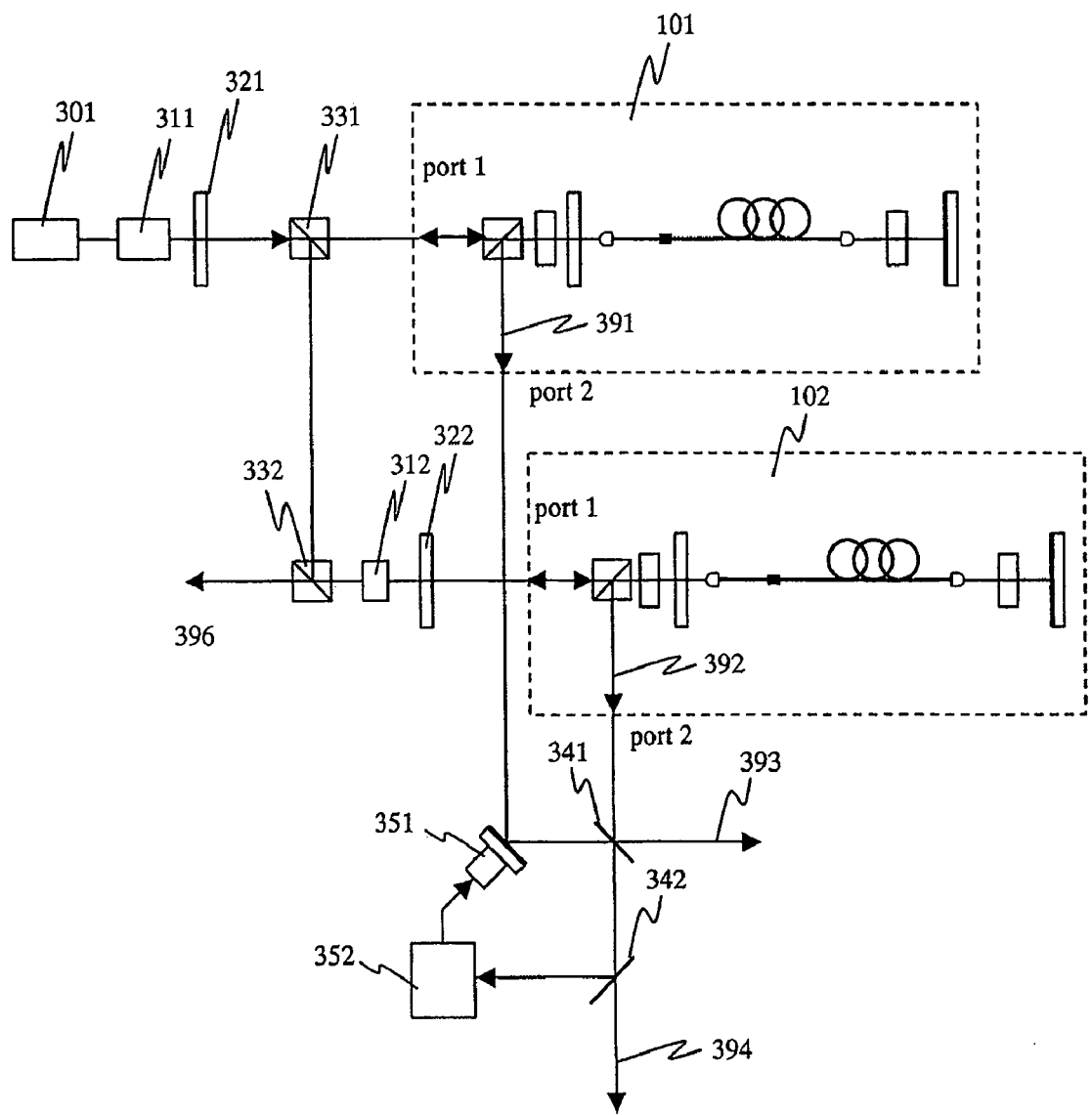
FIG. 13 is a diagram showing an example of generating an entangled photonic pair from the squeezed light that has been generated by the quantum-state generator described in the second embodiment.

FIG. 13 is a diagram showing an example of generating an entangled photonic pair from the squeezed light that has been generated by the quantum state generator 120 described in the second embodiment. In this example, the quantum state generator 120 described with reference to FIG. 8 is used. The pump light that has been outputted from a pump light source 301 passes through an isolator 311 and a λ/2 waveplate 321, and is then inputted to a polarizing beam splitter 331. The λ/2 waveplate 321 adjust the two output intensities of the polarizing beam splitter 331 so as to be equal to each other. The transmitted light of the polarizing beam splitter 331 is inputted to the quantum state generator 101 to obtain a squeezed light 391 of S-polarization. The reflected light of the polarizing beam splitter 331 is S-polarized and inputted to the polarizing beam splitter 332 and reflected. The reflected light of the polarizing beam splitter 332 passes through a Faraday rotator 312 with 45° rotation and adjusted into the P-polarization by a λ/2 waveplate 322, and then inputted to the quantum state generator 102. A squeezed light 392 that is an output of the quantum state generator 102 is S-polarized, and coupled with another squeezed light 391 by a beam splitter 341 to obtain beams 393 and 394 of a two-mode squeezed state which are entangled with each other quantum-mechanically. In the coupling in the beam splitter 341, because the phases of the squeezed lights 391 and 392 must be fixed, a part of the beam 394 is extracted by the beam splitter 342, the relative phase of the squeezed lights 391 and 392 are analyzed from that signal by a control unit 352, and a piezoelectric device 351 is drived so that the relative phase of the squeezed lights 391 and 392 is constant.

In the quantum state generator 102, a reflected pump light 396 passes through the λ/2 waveplate 322 and the Faraday rotator 312, and returns to the polarizing beam splitter 332 in P-polarization, and is transmitted through the polarizing beam splitter 332. The beam 396 can be used as the reference light for detecting the beams 393 and 394.

By reference to FIG. 13, the method of generating the two-mode squeezed state that is quantum-mechanically entangled was described. In the following, a description will give a method of implementing the quantum teleportation that can transmit the quantum-mechanical signal by using the two-mode squeezed state.

Figure 14:
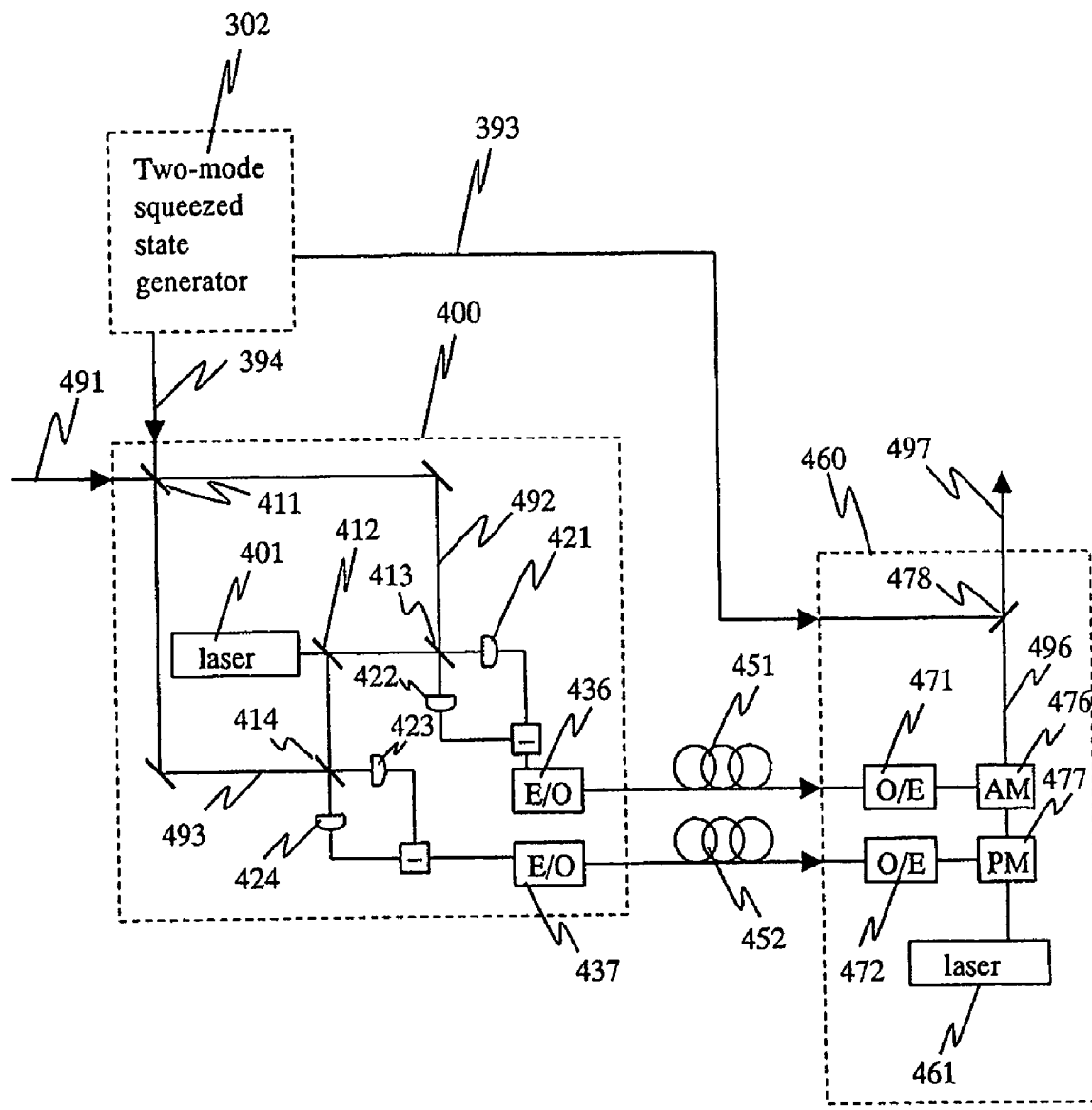
FIG. 14 is a block diagram showing an example that implements quantum teleportation that can transmit a quantum-mechanical signal by using a two-mode squeezed state.

FIG. 14 is a block diagram showing an example that implements quantum teleportation that can transmit a quantum-mechanical signal by using a two-mode squeezed state. Reference numeral 302 denotes a two-mode squeezed state generator, 400 is a transmitter, and 460 is a receiver. Reference numeral 491 denotes an input optical signal to be transmitted, and the optical signal 491 may be the quantum light or the classical light. The optical signals that are transmitted through the optical fibers 451 and 452 are the classical light, but an output signal light 497 reproduces the input optical signal 491. Two outputs 393 and 394 of the two-mode squeezed state generator 302 support the reproduction. That is, the transmission of the necessary information for reconstruction of the input light signal 491 uses the classical line, but the transmission of the quantum state that does not include the signal information uses another quantum line. The input signal light can be reproduced only when obtaining all of the signal information from the classical line and the quantum state that is transmitted through the quantum line. The output light that has meaningful information is not obtained if any one of those lines is lacked. Accordingly, when the information and the quantum state are independently time-spatially transmitted, the absolutely secure communication can be performed. Hereinafter, a flow of the specific processing will be described.

In the transmitter 400, the input signal light 491 is coupled with the two-mode squeezed light 394 by the beam splitter 411 of 50:50. The two coupled beams 492 and 493 are coupled with the output light from a laser 401 of a local oscillator by the beam splitters 413 and 414 of 50:50, and is balanced-homodyne-detected by a pair of photo detectors 421 and 422, or a pair of photo detectors 423 and 424. The output signals of the two balanced homodyne detections are two orthogonal phase components of the coupled light of the beams 491 and 394, respectively. The output signals of the balanced homodyne detections are transformed into optical signals by electro-optic converters 436 and 437, and then transmitted to the receiver 460 through the optical fibers 451 and 452.

In the receiver 460, the optical signals are again converted into electric signals by the photoelectric converters 471 and 472, and the output light from a laser 461 of a local oscillator is modulated in amplitude and phase. When a modulated laser beam 496 is coupled with another two-mode squeezed light 393 by a beam splitter 478, an output light 497 is obtained. The two-mode squeezed light 393 is transmitted through the transmission line that is separated from the optical fibers 451 and 452. Since it is necessary, in principle, to perfectly use up the two-mode squeezed light 393 when the input optical signal 491 is reproduced as the output light 497, the reflectivity of the beam splitter 478 is set to be as high as possible, for example, 99%. Although the transmittance of the modulated laser beam 496 drops to 1%, there arises no problem if the output intensity from the local oscillator 461 is sufficiently high. With the above structure, the quantum teleportation can be conducted.

Fifth Embodiment

This embodiment has shown that the squeezed light can be generated by using a general single mode fiber. However, the fiber may be generally replaced by an arbitrary single mode waveguide, and can be formed of a planar lightwave circuit (PLC). The PLC can downsize the core and increase the nonlinearity, and the squeezed light can be efficiently generated. Also, the PLC is not a circularly symmetric waveguide normally, and the PLC has a large birefringence. In this embodiment, because the two polarization modes have been regarded as independent beams, it is necessary that two optical pulses of the different polarization modes are temporally separated. In the second embodiment, the temporal separation of two polarized components was conducted by the polarization maintaining fiber and another method. The PLC can achieve the two functions at the same time, the temporal separation can be performed by the large birefringence, and the squeezed state can be efficiently generated by the large nonlinearity. Hereinafter, an example of the squeezed light generator using the PLC will be described.

Figure 15A:
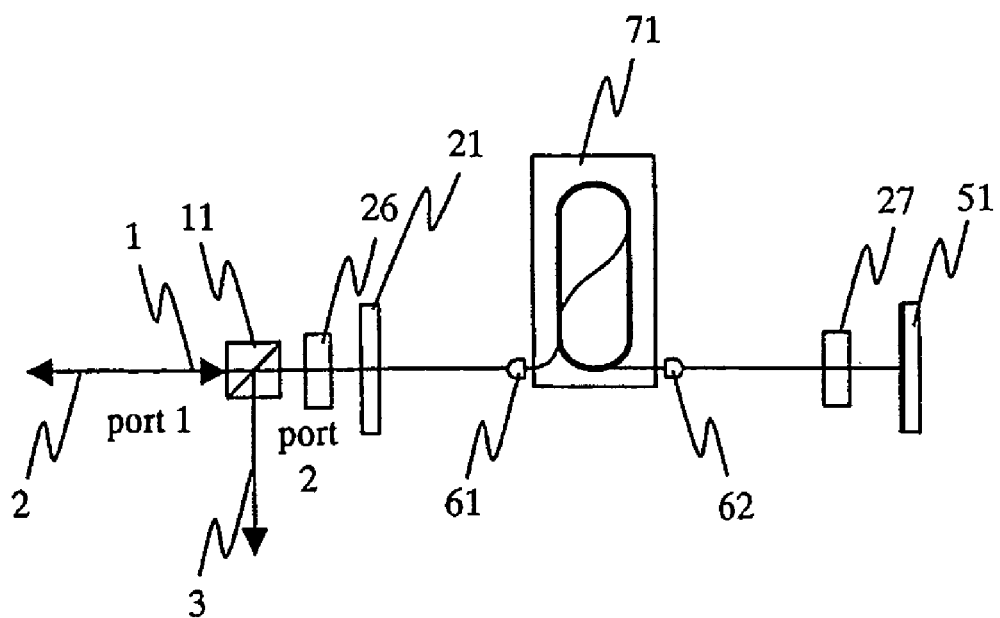
FIG. 15A is a structural diagram showing an example of using a PLC for a squeezed light generator shown in FIG. 8.

FIG. 15A is a structural diagram showing an example of using a PLC for the squeezed light generator shown in FIG. 8. As is apparent as compared with FIGS. 8 and 15A, the polarization maintaining fiber 36 and the optical fiber 37 are replaced by the PLC (planar lightwave circuit) 71 and two functions are achieved at the same time.

Figure 15B:
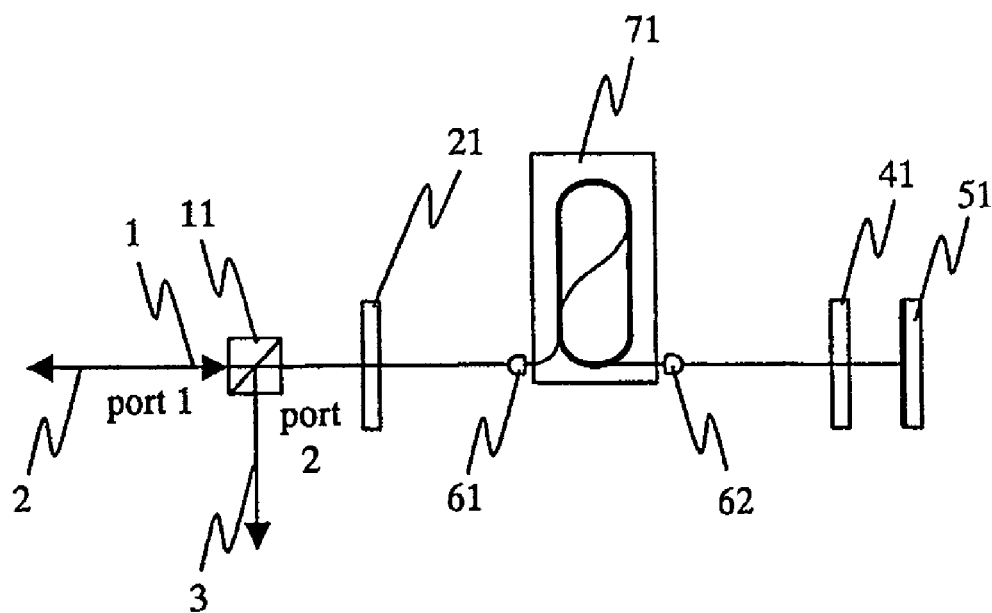
FIG. 15B is a diagram showing a structural example in the case where a Faraday rotator is replaced by a λ/4 waveplate in the structural diagram of FIG. 15A.

Since the PLC is of the polarization maintaining type, the function of the Faraday rotator 27 can be achieved by the $\lambda/4$ waveplate 41 (FIG. 15B). The optical axis of the $\lambda/4$ waveplate 41 is adjusted so as to form 45° with respect to the optical axis of the PLC 71. The Faraday rotator uniformly rotates the polarization by 90° by one reciprocation, and the $\lambda/4$ waveplate that has been adjusted as described above exchanges two polarized waves that are orthogonal to each other in the reciprocation. Accordingly, when the pump light that has passed through the polarizing beam splitter 11 reciprocates the PLC 71 and returns to the original position, in order to return to the same polarization as that before reciprocation, the polarization is necessary to rotate by 180° in the case of the Faraday rotator, and the two Faraday rotators 26 and 27 are used. In the case of the $\lambda/4$ waveplate 41, since the axes of the two polarized lights are merely exchanged with each other, the polarization becomes identical between before and after the reciprocation of the PLC 71. Only one $\lambda/4$ waveplate 41 may be used. Even in the structure using the Faraday rotator, or even in the structure using the $\lambda/4$ waveplate, the use of the PLC can realize the downsizing and an increase in the nonlinearity at the same time, and the squeezed light can be more efficiently generated.

Figure 16:
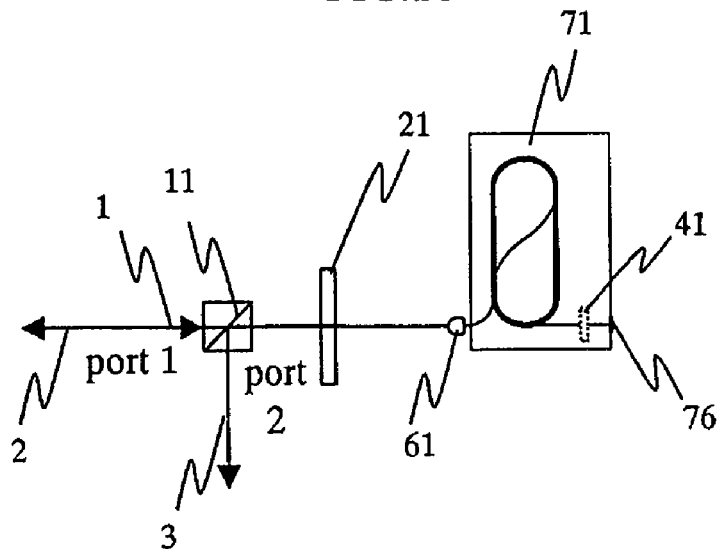
FIG. 16 is a structural diagram showing another example of the squeezed optical generator using the PLC.

FIG. 16 is a structural diagram showing another example of the squeezed optical generator using the PLC 71. In the structure of FIG. 15B, the $\lambda/4$ waveplate 41 is located out of the PLC 71. This example is different from the above example in that the $\lambda/4$ waveplate 41 is embedded within the PLC 71. An aperture for inserting the $\lambda/4$ waveplate 41 in the interior of the PLC 71 is opened, and the $\lambda/4$ waveplate 41 is embedded into the aperture. The end surface of the PLC 71 is high-reflection-coated instead of using the mirror 51.

Figure 17:
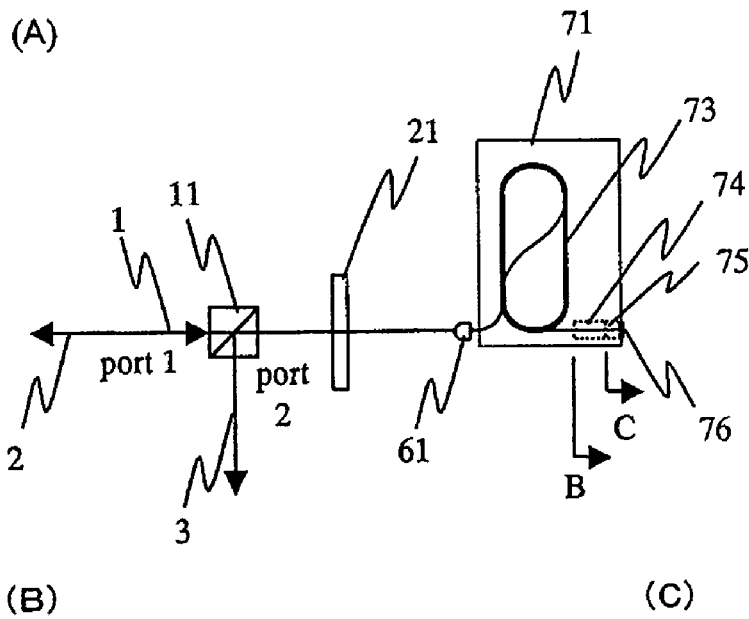
FIG. 17A is a structural diagram for explaining an example in which the structure of the squeezed optical generator is further simplified by using the PLC.
FIG. 17B is a cross-sectional view of FIG. 17A.
FIG. 17C is a cross-sectional view of FIG. 17A.
Figure 17:
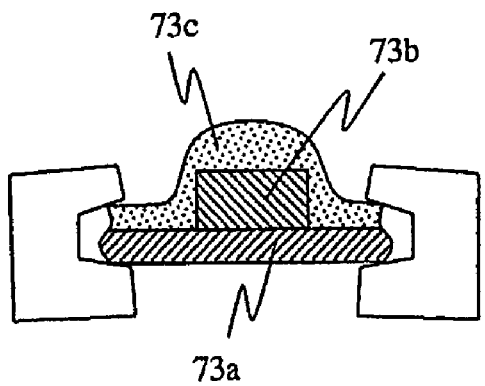
Figure 17:
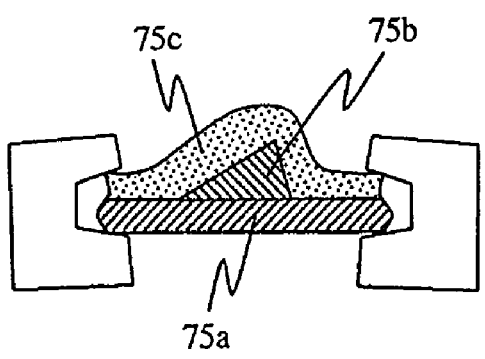

FIG. 17A is a structural diagram for explaining an example in which the structure of the squeezed optical generator is further simplified by using the PLC, and FIGS. 17B and 17C are partial cross-sectional views of FIG. 17A. In FIG. 17, instead of embedding of the $\lambda/4$ waveplate, a $\lambda/4$ waveplate is manufactured within the PLC.

The optical axis of the PLC 71 and the optical axis of the $\lambda/4$ waveplate form an angle of 45° as described with reference to FIG. 15B. In the normal PLC, the optical axes are parallel and perpendicular to the substrate plane, respectively. In FIG. 17, the optical axes of the waveguide 73 are like that, but in the waveguide 75, the optical axes are inclined by 45° around the rotation axis of the waveguide direction. The waveguide 75 has the same optical length as a $\lambda/4$ waveplate so that the function of a $\lambda/4$ waveplate can be made within the PLC. The waveguide 74 is a portion for smoothly connecting the waveguides 73 and 75 that are different in the structure from each other. One end surface of the waveguide 75 coincides with the end surface of the entire PLC, and high-reflection-coated 76 to provide a downsized and integrated squeezed optical generator.

FIG. 17B is a cross-sectional view showing an end surface of the waveguide 73, and FIG. 17C is a cross-sectional view showing an end surface of the waveguide 75. As shown in FIG. 17B, the waveguide 73 of the normal PLC waveguide is rectangular in the cross section, and the optical axes are parallel and perpendicular to the substrate 73a. Reference 73b denotes a core of the waveguide, and 73c is a cover layer. The substrate 73a and the cover layer 73c serve as a clad of the waveguide. On the other hand, as shown in FIG. 17C, when the symmetry of the sectional configuration of the core 75b of the waveguide is broken, the optical axes are rotated, and it is possible to provide the function of a waveplate. Since reflection may occur on the connection part when the cores of the sectional configuration shown in FIGS. 17B and 17C are connected directly to each other, the waveguide 74 is provided for smoothly connecting those cores to each other. The respective lengths of the waveguides 74 and 75 are determined so that the function of the λ/4 waveplate is achieved by the entire waveguides 74 and 75.

Sixth Embodiment

Figure 18:
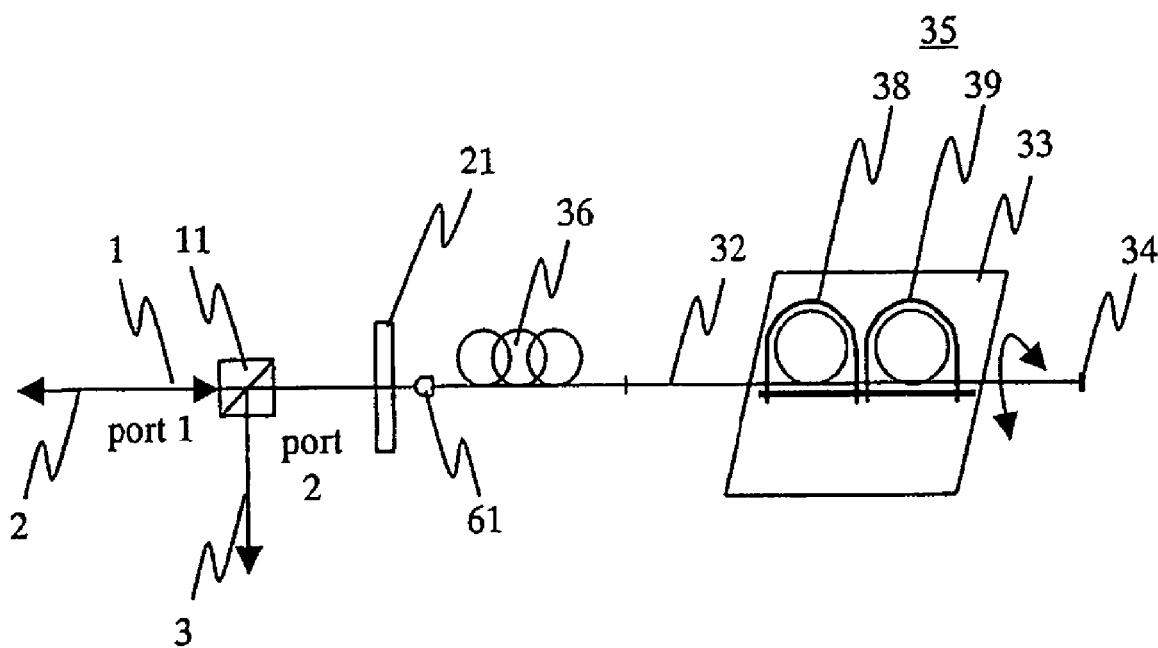
FIG. 18 is a diagram showing the structure that realizes an integral squeezed optical generator by using an optical fiber.

FIG. 18 is a diagram showing the structure that realizes an integral squeezed optical generator by using an optical fiber. As is apparent as compared with FIGS. 8 and 18, the optical fiber 37 is replaced by a polarization maintaining fiber 36, the Faraday rotator 27 is replaced by a fiber-type λ/4 waveplate 35, and the Faraday rotator 26 is omitted. Since the polarization maintaining fiber 36 is used for the part of the arbitrary fiber, the particular polarization maintaining fiber for temporally separating two polarized lights is unnecessary. As shown in FIG. 18, the fiber-type λ/4 waveplate 35 is made up of the ordinary single mode fiber 32 and rotating equipment 38 and 39. A part of the single mode fiber 32 is winded on the rotating equipment 38 and 39 by one turn or two turns, respectively, and twisted in the directions indicated by arrows in the figure. As a result, the birefringence of the single mode fiber 32 changes, and the rotating equipment 38 and 39 functions as a λ/4 waveplate or a λ/2 waveplate. The rotating equipment may be, in principle, one piece corresponding to a λ/4 waveplate on which the fiber is turned once, but in order to surely ensure the adjustment range, the rotating equipment corresponding to a λ/2 waveplate is inserted. In addition, if the certainty is more enhanced, another rotating equipment corresponding to the λ/4 waveplate on which the fiber is winded by one turn is added. The polarization maintaining fiber 36 and the single mode fiber 32 are spliced together, and a high reflective coating 34 is formed on another end of the single mode fiber 32 to provide an integral squeezed optical generator.

The squeezed state can be generated even by using the optical fiber that does not maintain the polarization, and the degree of freedom of the characteristics such as the wavelength band or the pulse width of the squeezed light which are limited at present by the characteristics of the polarization maintaining fiber is improved. In particular, in the communication wavelength band of 1.55 μm, the optical fibers of various characteristics are prepared, and therefore, the advantages brought from this invention are significant from the viewpoint of the application to the communication. In addition, when the squeezed light that can be readily generated is transmitted together with the reference light as a set, the communication using the squeezed light that is one example of the quantum light can be realized.

The present invention provides a method for realizing the high-security quantum communication. The security of information is important infrastructure for supporting the advanced information society, and the present invention is employed to realize the society that assures the security.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The reference numerals in Figs. are as follows:
100: OPTICAL TRANSMITTER
200: OPTICAL RECEIVER
110: LIGHT SOURCE
120: QUANTUM STATE GENERATOR
142: AMPLIFIER
141: MODULATOR
192: REFERENCE LIGHT
194: SIGNAL LIGHT
161: COUPLER
231: AMPLIFIER
232: WAVEFORM SHAPING UNIT
250: PHASE ANALYZER
212: POLARIZATION ANALYZER
231: AMPLIFIER
232: WAVEFORM SHAPING UNIT
250: PHASE ANALYZER
213: POLARIZATION ANALYZER
231: AMPLIFIER
232: WAVEFORM SHAPING UNIT
250: PHASE ANALYZER
214: POLARIZATION ANALYZER
231: AMPLIFIER
232: WAVEFORM SHAPING UNIT
250: PHASE ANALYZER
216: INTENSITY ANALYZER

What is claimed is:
1. An optical transmitter, comprising:
a quantum state generator having one light source as an exciting source;
a modulator that superimposes a signal on a quantum state that is outputted from the quantum state generator to provide a signal light;
a polarization controller for the signal light that is outputted from the modulator;
an optical delay unit that adjusts an optical path length of a reference light which is a non-quantum light that is emitted from the quantum state generator;
a polarization controller for the reference light; and
a polarizing beam coupler that couples the signal light and the reference light whose polarizations are orthogonal to each other where the signal light and the reference light are spatially and temporally superimposed on each other, wherein
the quantum state generator comprises a polarizing beam coupler, a first Faraday rotator, a means for delaying the two orthogonal components of polarized light, an optical path including an optical fiber and a second Faraday rotator, and a high-reflection mirror, and
after a linearly polarized light is inputted to the polarizing beam coupler and an output light from the polarizing beam coupler is propagated in the optical path, the output light is returned to the identical optical path by the high-reflection mirror and propagated backward, and then the output light is returned to the polarizing beam coupler, and the linearly polarized light that is initially inputted and a squeezed light that is generated by light propagation in the series of optical paths are separated and extracted.

2. The optical transmitter according to claim 1, wherein the optical path has a λ/2 waveplate disposed at the post- or pre-stage of the first Faraday rotator.

3. The optical transmitter according to claim 1, wherein the means for delaying the two orthogonal components of polarized light, which constitutes the optical paths, comprises a polarization maintaining optical fiber.

4. The optical transmitter according to claim 1, wherein the means for delaying the two orthogonal components of polarized light, which constitutes the optical paths, comprises a polarization maintaining optical fiber, and the polarization maintaining optical fiber is spliced with the optical fiber.

5. The optical transmitter according to claim 1, wherein the means for delaying the two orthogonal components of polarized light, which constitutes the optical paths, comprises two polarizing beam splitters, a first polarizing beam splitter separates the optical path into two optical paths, a delay is given the two optical paths, and polarized beams are re-coupled by a second polarizing beam splitter.

6. An optical transmitter wherein, in the quantum state generator according to claim 1, the first Faraday rotator and the means for delaying the two orthogonal components of polarized light are omitted, and the optical fiber and the second Faraday rotator are replaced by a polarization maintaining waveguide and a λ/4 waveplate, respectively, and the quantum state generator comprises an optical path including the polarizing beam coupler, the polarization maintaining waveguide, and the λ/4 waveplate, and a high-reflection mirror, and after linearly polarized light is inputted to the polarizing beam coupler and an output light from the polarizing beam coupler is propagated in the optical path, the output light is returned to the identical optical path by the high-reflection mirror and propagated backward, and then the output light is returned to the polarizing beam coupler, and the linearly polarized light that is initially inputted and the squeezed light that is generated by light propagation in the series of optical paths are separated and extracted.

7. The optical transmitter according to claim 6, wherein the optical path has a λ/2 waveplate at a pre-stage of the waveguide.

8. The optical transmitter according to claim 6, wherein the waveguide comprises a planar lightwave circuit (PLC).

9. The optical transmitter according to claim 6, wherein the λ/4 waveplate comprises a fiber-type device functioning a λ/4 waveplate.

10. An optical transmitter/receiver system, comprising:
an optical transmitter comprising:
a quantum state generator having one light source as an exciting source;
a modulator that superimposes a signal on a quantum state that is outputted from the quantum state generator to provide a signal light;
a polarization controller for the signal light that is outputted from the modulator;
an optical delay unit that adjusts an optical path length of a reference light which is a non-quantum light that is emitted from the quantum state generator;
a polarization controller for the reference light; and
a polarizing beam coupler that couples the signal light and the reference light whose polarizations are orthogonal to each other where the signal light and the reference light are spatially and temporally superimposed on each other;
an optical fiber that transmits a signal transmitted from the optical transmitter; and
an optical receiver that detects, with the transmitted reference light, the transmitted quantum light that has been modulated by a transmission signal, and that reproduces the transmission signal from the detection signal, wherein the quantum state generator comprises a polarizing beam coupler, a first Faraday rotator, a means for delaying the two orthogonal components of polarized light, an optical path including an optical fiber and a second Faraday rotator, and a high-reflection mirror, and after a linearly polarized light is inputted to the polarizing beam coupler and an output light from the polarizing beam coupler is propagated in the optical path, the output light is returned to the identical optical path by the high-reflection mirror and propagated backward, and then the output light is returned to the polarizing beam coupler, and the linearly polarized light that is initially inputted and a squeezed light that is generated by light propagation in the series of optical paths are separated and extracted.

11. The optical transmitter/receiver system according to claim 10, wherein the optical path has a λ/2 waveplate is disposed at a post- or pre-stage of the first Faraday rotator.

12. The optical transmitter/receiver system according to claim 10, wherein the means for delaying the two orthogonal components of polarized light, which constitutes the optical paths, comprises a polarization maintaining optical fiber.

13. The optical transmitter/receiver system according to claim 10, wherein the means for delaying the two orthogonal components of polarized light, which constitutes the optical paths, comprises a polarization maintaining optical fiber, and the polarization maintaining optical fiber is spliced with the optical fiber.

14. The optical transmitter/receiver system according to claim 10, wherein the means for delaying the two orthogonal components of polarized light, which constitutes the optical paths, comprises two polarizing beam splitters, a first polarizing beam splitter separates the optical path into two optical paths, a delay is given the two optical paths, and polarized beams are re-coupled by a second polarizing beam splitter.

15. An optical transmitter/receiver system, wherein, in the quantum state generator according to claim 10, the first Faraday rotator and the means for delaying the two orthogonal components of polarized light are omitted, and the optical fiber and the second Faraday rotator are replaced by a polarization maintaining waveguide and a λ/4 waveplate, respectively, and the quantum state generator comprises an optical path including the polarizing beam coupler, the polarization maintaining waveguide, and the λ/4 waveplate, and a high-reflection mirror, and after linearly polarized light is inputted to the polarizing beam coupler and an output light from the polarizing beam coupler is propagated in the optical path, the output light is returned to the identical optical path by the high-reflection mirror and propagated backward, and then the output light is returned to the polarizing beam coupler, and the linearly polarized light that is initially inputted and the squeezed light that is generated by light propagation in the series of optical paths are separated and extracted.

16. A quantum optical generator comprising:

a polarizing beam coupler; a first Faraday rotator; a means for delaying the two orthogonal components of polarized light; an optical path including an optical fiber and a second Faraday rotator; and a high-reflection mirror, wherein after a linearly polarized light is inputted to the polarizing beam coupler and an output light from the polarizing beam coupler is propagated in the optical path, the output light is returned to the identical optical path by the high-reflection mirror and propagated backward, and then the output light is returned to the polarizing beam coupler, and the linearly polarized light that is initially inputted and a squeezed light that is generated by light propagation in the series of optical paths are separated and extracted.

17. The quantum optical generator according to claim 16, wherein a $\lambda/2$ waveplate is disposed at a post- or pre-stage of the first Faraday rotator.

18. The quantum optical generator according to claim 16, wherein the means for delaying the two orthogonal components of polarized light comprises a polarization maintaining optical fiber.

19. The quantum optical generator according to claim 16, wherein the means for delaying the two orthogonal components of polarized light comprises a polarization maintaining optical fiber, and the polarization maintaining optical fiber is spliced with the optical fiber of a post stage.

20. The quantum optical generator according to claim 16, wherein the means for delaying the two orthogonal components of polarized light comprises two polarizing beam splitters, a first polarizing beam splitter separates the optical path into two optical paths, a delay is given the two optical paths, and polarized beams are re-coupled by a second polarizing beam splitter.

* * * * *